US005636041A

United States Patent [19]

Pearce et al.

[11] Patent Number: 5,636,041

[45] Date of Patent: Jun. 3, 1997

[54] TECHNIQUE FOR INCREASING THE VISIBILITY OF AN LCD PANEL DURING WARM-UP THEREOF

[75] Inventors: John J. Pearce, Del Valle; Philip Chidester, Austin, both of Tex.

[73] Assignee: Dell USA, L.P., Austin, Tex.

[21] Appl. No.: 449,614

[22] Filed: May 24, 1995

[51] Int. Cl.$^6$ .......................... G02F 1/1335; G09G 3/36; G09G 5/10

[52] U.S. Cl. ............................ 349/61; 345/102; 345/147

[58] Field of Search .............................. 359/48, 49, 50; 362/85, 802; 345/89, 101, 102, 147

[56] References Cited

U.S. PATENT DOCUMENTS

| | | | |
|---|---|---|---|
| 3,798,366 | 3/1974 | Hunt et al. | 345/147 |
| 4,354,186 | 10/1982 | Groothuis | 345/147 |
| 4,631,591 | 12/1986 | Lee | 358/190 |
| 4,760,389 | 7/1988 | Aoki et al. | 359/59 |
| 4,990,981 | 2/1991 | Tanaka et al. | 359/45 |
| 5,070,379 | 12/1991 | Nomoto et al. | 357/23.7 |
| 5,081,451 | 1/1992 | Takekawa et al. | 345/147 |
| 5,157,525 | 10/1992 | Eaton et al. | 359/55 |
| 5,164,849 | 11/1992 | Evans et al. | 357/23.7 |
| 5,184,117 | 2/1993 | Gauthier | 345/102 |
| 5,272,327 | 12/1993 | Mitchell et al. | 250/205 |
| 5,506,698 | 4/1996 | Nishihara | 345/147 |

FOREIGN PATENT DOCUMENTS

| | | | |
|---|---|---|---|
| 54-124928 | 9/1979 | Japan | 359/48 |
| 59-208528 | 11/1984 | Japan | 345/102 |
| 62-145222 | 6/1987 | Japan | 359/48 |
| 2-18520 | 1/1990 | Japan | 345/102 |
| 2-124530 | 5/1990 | Japan | 345/89 |
| 4-106520 | 4/1992 | Japan | 359/48 |
| 4-174819 | 6/1992 | Japan | 359/48 |
| 4-264489 | 9/1992 | Japan | 345/102 |
| 5-127635 | 5/1993 | Japan | 345/77 |
| 6-130363 | 5/1994 | Japan | 345/102 |
| 94/12971 | 6/1994 | WIPO | 345/147 |

*Primary Examiner*—William L. Sikes
*Assistant Examiner*—Tiep H. Nguyen
*Attorney, Agent, or Firm*—Haynes and Boone, L.L.P.

[57] ABSTRACT

Method and apparatus for automatically increasing the visibility of an LCD during warm-up thereof is disclosed. In a preferred embodiment, the system of the present invention comprises brightness control circuitry electrically connected to an LCD panel of a portable personal computer (PC) or other battery operated electronic device for controlling the brightness level of the LCD. The brightness control circuitry is also electrically connected to receive a signal indicative of a brightness control level selected by a user using a user-settable control means, such as a brightness control knob located on the device. In operation, on power up of the LCD, the brightness control circuitry increases the LCD brightness to a maximum level, regardless of the brightness level selected by the user. Once the LCD has warmed up, the brightness control circuitry decreases the brightness level of the LCD to the level selected by the user. In one aspect of the invention, the brightness level is decreased incrementally such that its occurrence is virtually undetectable by the user.

16 Claims, 2 Drawing Sheets

TECHNIQUE FOR INCREASING THE VISIBILITY OF AN LCD PANEL DURING WARM-UP THEREOF

TECHNICAL FIELD

The invention relates generally to liquid crystal displays (LCDs) and, more particularly, to a system for increasing the visibility of an LCD of a computer during a warm-up period thereof.

BACKGROUND OF THE INVENTION

Liquid crystal displays (LCDs) are used in portable computers and other electronic devices to display information. LCDs modulate light to create images using selectively transmissive and opaque portions of the display, the selection being controlled by passing electric current through the liquid crystal material. Transmissive-type LCDs are illuminated by an artificial backlight positioned behind the LCD glass to provide the contrast between the light transmissive and opaque portions of the display. An undesirable characteristic of such LCDs is that they typically take a long time to warm up. During its warm-up period, the visibility of an LCD is usually inadequate, due to the low contrast ratio between the light transmissive and opaque portions thereof.

To remedy the visibility problem encountered during LCD warm-up, users will often attempt to counteract the problem by manually increasing the brightness level of the LCD, using a brightness control knob, for example, to a maximum level. Although this does substantially increase the visibility of the LCD, this solution is deficient in that the user will often neglect to return the brightness back to a normal level once the LCD has completely warmed up. Continuous use of the PC with the LCD at maximum brightness consumes a large amount of power and results in the battery of the PC being depleted much more quickly than desired. For example, in a particular portable PC in which the LCD has sixteen different "brightness" levels, operating the PC with the LCD brightness control set to level sixteen consumes twice as much power than if the PC were operated with he LCD brightness control set to level fourteen.

Therefore, what is needed is a system for automatically increasing the visibility of an LCD during warm-up thereof without substantially increasing the amount of power consumed by the LCD after it has warmed up.

SUMMARY OF THE INVENTION

The foregoing problems are solved and a technical advance is achieved by method and apparatus for automatically increasing the visibility of an LCD during warm-up thereof. In a departure from the art, brightness control circuitry of the present invention automatically increases the brightness level of an LCD to a maximum level on power up of the LCD and subsequently incrementally decreases the LCD brightness level to a user-selected level once the LCD has completely warmed up.

In a preferred embodiment, the system of the present invention comprises brightness control circuitry electrically connected to an LCD panel of a portable personal computer (PC) or other battery operated electronic device for controlling the brightness level of the LCD. The brightness control circuitry is also electrically connected to receive a signal indicative of a brightness control level selected by a user using a user-settable control means, such as a brightness control knob, associated with the LCD 12 and located on the device in a user-accessible location.

In operation, on power up of the LCD, the brightness control circuitry increases the LCD brightness to a maximum level, regardless of the brightness level selected by the user. Once the LCD has warmed up, the brightness control circuitry decreases the brightness level of the LCD to the level selected by the user. In one aspect of the invention, the LCD brightness level is decreased incrementally such that its occurrence is virtually undetectable by the user.

A technical advantage achieved with the invention is that it provides increased LCD visibility on power-up of the LCD automatically and without user intervention.

Another technical advantage achieved with the invention is that it aids in reducing the power consumption of a battery operated device having an LCD-type display by automatically maximizing the brightness of the LCD immediately on power up thereof, thereby deterring a user from manually increasing the brightness to a maximum level and then subsequently neglecting to decrease the brightness to a normal level once the LCD has completely warmed up.

DETAILED DESCRIPTION OF THE PREFERRED EMBODIMENT

Figure 1:
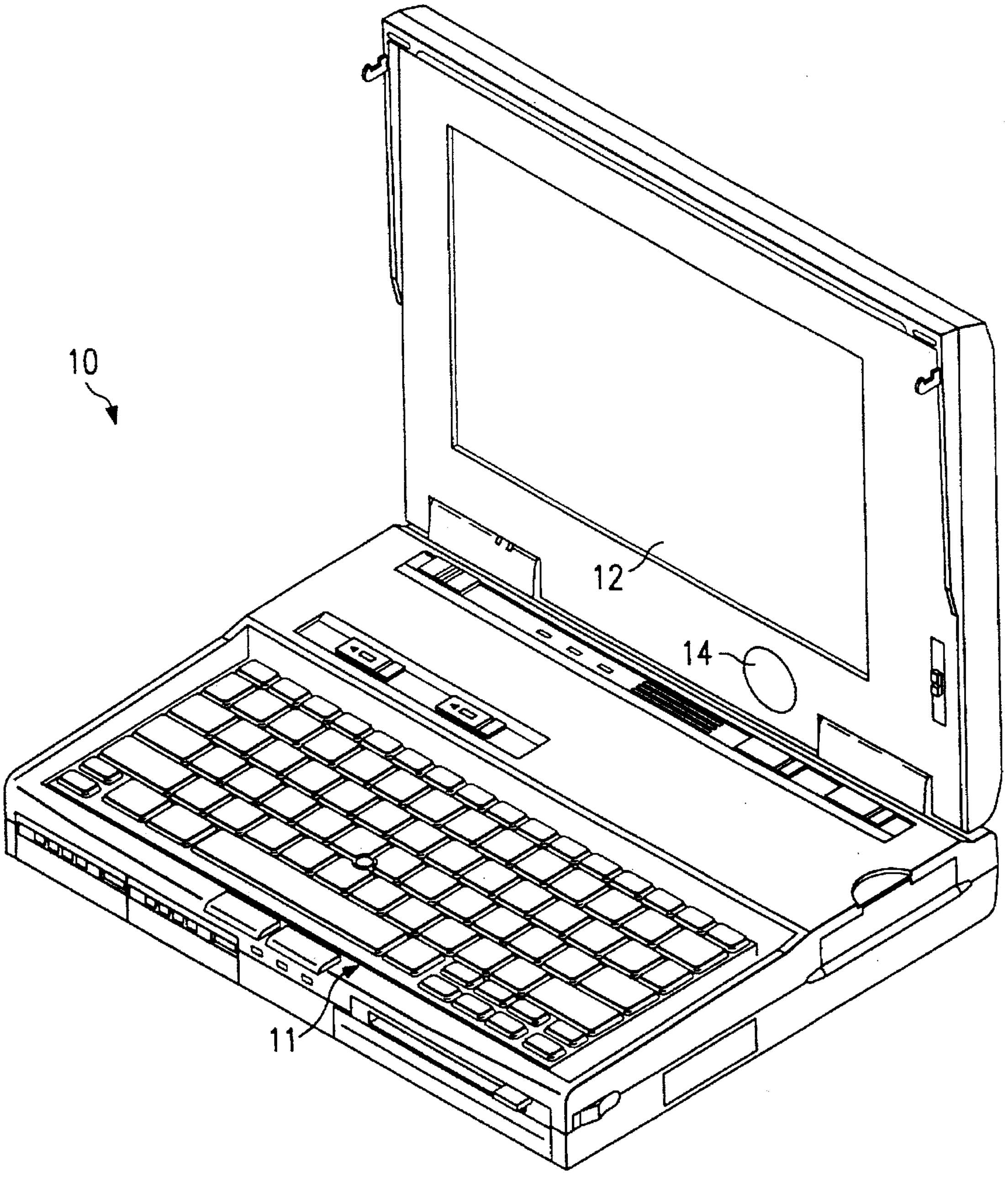
FIG. 1 is a perspective view of a portable personal computer (PC) embodying features of the present invention.

FIG. 1 illustrates a portable personal computer (PC) 10 embodying features of the present invention and comprising a keyboard 11, liquid crystal display panel (LCD) 12 and a brightness control knob 14 for enabling the user to adjust the brightness of the LCD 12. As will be described in detail below, in accordance with a feature of the present invention, during a warm-up period of the LCD 12, the brightness of the LCD 12 is maximized, regardless of the brightness level selected by the user via the control knob 14. Subsequent to the warm-up period, the brightness of the LCD is incrementally decreased until it is at the brightness level selected by the user with the brightness control knot 14.

Figure 2:
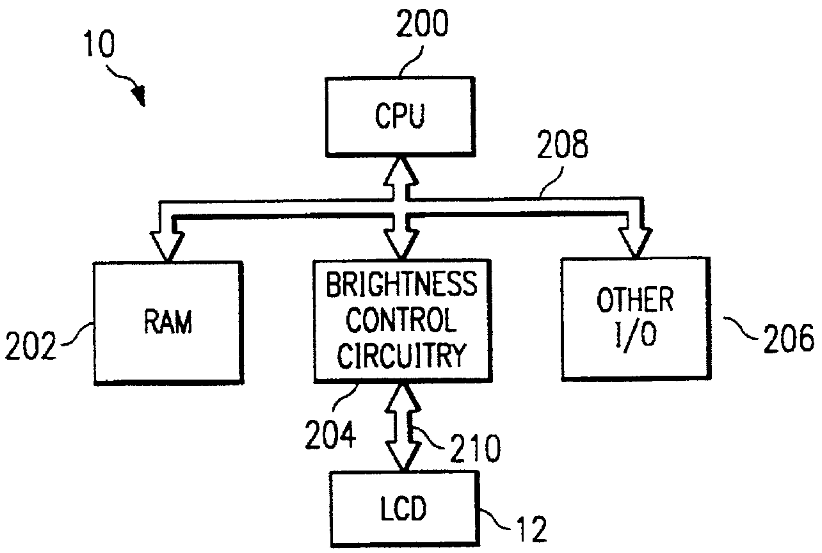
FIG. 2 is a system block diagram of the portable PC of FIG. 2.

FIG. 2 is a system block diagram of the PC 10 of FIG. 1. In a preferred embodiment, the PC 10 comprises a CPU 200, system RAM 202, brightness control circuitry 204 and other I/O devices 206, including keyboard 11 (FIG. 1) electrically interconnected via a bus 208. The brightness control circuitry is further connected to the LCD 12 via a plurality of control lines, collectively designated by a reference numeral 210. As will be described, a signal indicative of the brightness level selected by the user using the brightness control knob 14 (FIG. 1) (hereinafter "user brightness level signal" or "UBL signal") is transmitted to the brightness control circuitry 204 via the control lines 210. As will be described, on power up of the LCD 12, the brightness control circuitry 204 causes the LCD 12 to operate at its maximum brightness level, regardless of the brightness level selected by the user, as indicated by the UBL signal. Once the LCD 12 has sufficiently warmed-up, as determined by the brightness control circuitry 204 via control lines 210, the brightness control circuitry 204 incrementally decreases the brightness level of the LCD 12 until it reaches the level selected by the user using the knob 14, as described in detail below with reference to FIG. 3.

Figure 3:
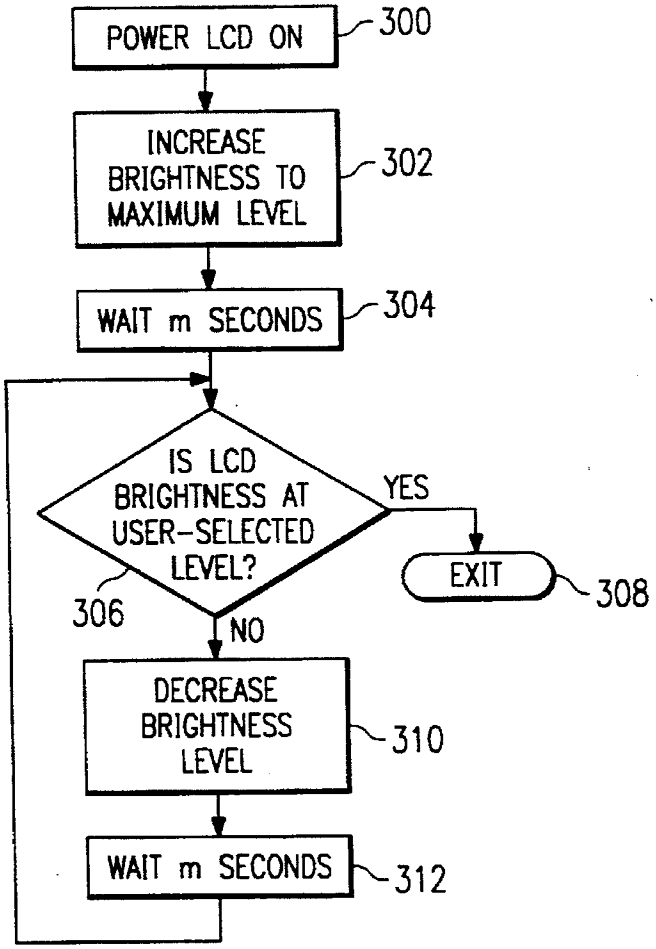
FIG. 3 is a flowchart of the method of the present invention for maximizing the brightness of an LCD panel during warm-up thereof.

FIG. 3 illustrates a flowchart of the algorithm implemented by the brightness control circuitry 204 for implementing the technique of the present invention. In step 300, the LCD 12 is powered on. In step 302, the brightness of the LCD 12 is increased to its maximum level by generating conventional control signals to the LCD 12 via the control lines 210. In step 304, the circuitry 204 waits a predetermined amount of time (m seconds) for the LCD 12 to warm up. It should be understood that the value of m in step 304 is determined empirically and is dependent upon the identity and characteristics of the particular LCD panel used to implement the LCD 12. In step 306, a determination is made whether the actual brightness level of the LCD 12 is the same as that selected by the user, as indicated by the UBL signal on the control lines 210. If so, the LCD 12 is at the appropriate brightness level and execution terminates in step 308; otherwise, execution proceeds to step 310. In step 310, the brightness of the LCD 12 is decreased by one level or a fraction thereof by generating conventional control signals to the LCD via the lines 210. In step 312, the circuitry 204 waits n seconds and then returns to step 306. In this regard, it should be understood that the number "n" may be a whole number or any fraction thereof, depending on the speed with which the LCD 12 brightness is to be reduced as weighed against the desire to reduce the LCD 12 brightness in a manner undetectable to the user.

In this manner, the brightness of the LCD 12 is incrementally decreased from the maximum level to the level selected by the user. It should be noted that, by decreasing the brightness level in small increments, the overall dimming of the LCD 12 will proceed substantially unnoticed by the user.

It is understood that the present invention can take many forms and embodiments. The embodiments shown herein are intended to illustrate rather than to limit the invention, it being appreciated that variations may be made without departing from the spirit or the scope of the invention. For example, the CPU 200, rather than separate brightness control circuitry 204, could implement the method of FIG. 3 and control the brightness control circuitry 204, could implement the method of FIG. 3 and control the brightness of the LCD 12 directly. In addition, the system of the present invention may be used in any number if different types of electronic devices having an LCD as its display.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In an electronic device having a liquid crystal display (LCD), a method of increasing the visibility of said LCD during a warm-up period thereof, the method comprising, responsive to said LCD being powered on:

setting a brightness level of said LCD to a maximum level;

subsequent to said setting, waiting a first predetermined amount of time;

upon expiration of said first predetermined amount of time, determining whether said LCD brightness level is set to a user-selected brightness level;

responsive to a determination that said LCD brightness level is not set to said user-selected brightness level, incrementally decreasing said LCD brightness level until said LCD brightness level is set to said user-selected brightness level.

2. The method of claim 1 wherein said first predetermined amount of time is determined empirically and is dependent on a plurality of parameters of said LCD.

3. The method of claim 1 wherein said incrementally decreasing said LCD brightness level is performed such that it is substantially undetectable by a user.

4. The method of claim 1 wherein said electronic device is a personal computer.

5. In an electronic device having a liquid crystal display (LCD), a method of increasing the visibility of said LCD during a warm-up period thereof, the method comprising, responsive to said LCD being powered on:

setting a brightness level of said LCD to a maximum level;

subsequent to said setting, waiting a first predetermined amount of time;

upon expiration of said first predetermined amount of time, determining whether said LCD brightness level is set to a user-selected brightness level;

responsive to a determination that said LCD brightness level is not set to said user-selected brightness level:

decreasing said LCD brightness level by a predetermined amount;

waiting a second predetermined amount of time; and repeating said decreasing and said waiting said second predetermined time period until said LCD brightness level is set to said user-selected brightness level.

6. The method of claim 5 wherein said first predetermined amount of time is determined empirically and is dependent on a plurality of parameters of said LCD.

7. The method of claim 5 wherein said predetermined amount and said second predetermined amount of time are small enough to enable said decreasing and waiting said second predetermined time period to be performed substantially undetected by a user.

8. The method of claim 5 wherein said electronic device is a personal computer.

9. Apparatus for increasing the visibility of a liquid crystal display (LCD) of an electronic device during a warm-up period of said LCD, the apparatus comprising:

means for generating a signal indicative of a user-selected brightness level;

means for setting a brightness level of said LCD to a maximum level and for determining whether said LCD brightness level is set to said indicated user-selected brightness level responsive to expiration of a predetermined time period, and for incrementally decreasing said LCD brightness level until said LCD brightness level is set to said indicated user-selected brightness level responsive to a determination that said LCD brightness level is not set to said indicated user-selected brightness level.

10. The apparatus of claim 9 wherein said generating means comprises a user-settable control located in a user-accessible location on said electronic device.

11. The apparatus of claim 9 wherein said setting means, said determining means and said decreasing means together comprise brightness control circuitry connected to said LCD.

12. The apparatus of claim 9 wherein said electronic device comprises a portable personal computer.

13. Apparatus for increasing the visibility of a liquid crystal display (LCD) of an electronic device during a warm-up period of said LCD, the apparatus comprising:

brightness control circuitry for generating control signals to said LCD for controlling a brightness level thereof;

a user-settable mechanism for generating a signal indicative of a user-selected brightness level to said brightness control circuitry;

wherein responsive to expiration of a predetermined time period, said brightness control circuitry determines whether said LCD brightness level is set to said indicated user-selected brightness level and, responsive to a determination that said LCD brightness level is not set to said indicated user-selected brightness level, incrementally decreases said LCD brightness level until said LCD brightness level is set to said indicated user-selected brightness level.

14. The apparatus of claim 13 wherein said electronic device is a personal computer.

15. The apparatus of claim 13 wherein said brightness control circuitry comprises a microprocessor.

16. The apparatus of claim 13 wherein said user-settable mechanism comprises a brightness control knob located in a user-accessible location on said electronic device.

* * * * *